United States Patent
Perry et al.

(10) Patent No.: US 7,930,235 B2
(45) Date of Patent: Apr. 19, 2011

(54) AGENCY PAYMENT SYSTEM

(76) Inventors: J. Scott Perry, New York, NY (US);
Wallace C. Turbeville, New York, NY (US); Paul Hamilton, Sea Cliff, NY (US)

( * ) Notice: Subject to any disclaimer, the term of this patent is extended or adjusted under 35 U.S.C. 154(b) by 461 days.

(21) Appl. No.: 11/333,789

(22) Filed: Jan. 17, 2006

(65) Prior Publication Data
US 2006/0178974 A1     Aug. 10, 2006

Related U.S. Application Data

(60) Provisional application No. 60/643,864, filed on Jan. 14, 2005.

(51) Int. Cl.
*G06Q 40/00* (2006.01)
(52) U.S. Cl. ............................................. 705/37
(58) Field of Classification Search .............. 705/35–45; 707/609, 705
See application file for complete search history.

(56) References Cited

U.S. PATENT DOCUMENTS

| | | | |
|---|---|---|---|
| 2001/0044771 A1* | 11/2001 | Usher et al. ............... | 705/37 |
| 2002/0010670 A1* | 1/2002 | Mosler et al. .............. | 705/37 |
| 2002/0120570 A1* | 8/2002 | Loy ............................. | 705/40 |
| 2003/0083978 A1* | 5/2003 | Brouwer ..................... | 705/37 |
| 2003/0144947 A1* | 7/2003 | Payne ......................... | 705/37 |
| 2005/0119919 A1* | 6/2005 | Eder ........................... | 705/4 |
| 2005/0119962 A1* | 6/2005 | Bowen et al. .............. | 705/37 |
| 2005/0137956 A1* | 6/2005 | Flory et al. ................. | 705/37 |
| 2005/0216387 A1* | 9/2005 | Barany et al. .............. | 705/35 |
| 2006/0155644 A1* | 7/2006 | Reid et al. .................. | 705/42 |

OTHER PUBLICATIONS

Hume et al., "Futures Exchanges Oppose Proposals to Exempt Swaps From CFTC Rules", Bond Buyer, v302n29064, pp. 1, Jan 8, 1993.*

* cited by examiner

*Primary Examiner* — Mary Cheung

(57) ABSTRACT

An agency payment system for transactions covered by a virtual market control entity between participants. The system determines all payments required to be made by each virtual market control entity participant on a given day. It nets all of each of the participant's required payments to be made with the payments received by the virtual market control entity on the previous day due to each participant to obtain a net cash movement, either from the virtual market control entity to the participant's account or from the participant's account to the virtual market control entity. It transfers between the participant's account and the virtual market control entity's account and each participant's account the net cash movements to the virtual market control entity's account. It then transfers between the virtual market control entity's account and each participant's account the net cash movements to the participant's account.

24 Claims, 3 Drawing Sheets

Hypothetical Participant (Positive/Negative Values

Represent net Receivable/Payable

Among all Participants)

|  | Power | Gas | Net by Category |
|---|---|---|---|
| Daily Cash Settlement (Swaps) | 20 | -14 | 6 |
| Daily Delivery (Forwards) | -32 | 27 | -5 |
| Daily Cash Market | -35 | 33 | <u>-2</u> |
| *Aggregate Net* |  |  | *-1* |

On the day depicted, 1 would be the net amount called from the Participant.

FIG. 1

| Participant Name | Product | Delivery Period | Counterparty | Quantity |
|---|---|---|---|---|
|  |  |  |  |  |

FIG. 2

AGENCY PAYMENT SYSTEM

This application claims the priority of prior U.S. Application 60/643,864 filed on Jan. 14, 2005.

BACKGROUND OF THE INVENTION

The invention is generally related to a method of managing credit risks and reducing operational expenses associated with the sale and purchase of certain commodities. More specifically, the invention relates to a method of shortening the payable cycles for certain commodities and centralizing the payment function via electronic interfaces for standardized contractual relationships.

In the purchase and sale of certain commodities, the delivery cycle is often much shorter than the billing cycle. This results in a build-up of accounts payable related to a product which has already been delivered, and in many cases consumed. This issue can be addressed on a bilateral basis between individual counterparties by requiring parties to prepay or by operating with shorter billing cycles which match the delivery cycles as closely as possible. However, prepayments result in a capital cost to a Buyer, and shortened billing cycles result in a far greater number of financial settlements between counterparties and greatly increase overhead expenses. Accordingly, there is a need to reduce the length of the billing cycle to the shorter delivery cycle without significantly affecting the capital outlays required in prepayment and without burdening the parties with increased overhead expenses related to the billing cycles.

The market for electrical power is a prime example of the sort of transactions which are susceptible to the problems which this invention is suited to address. In the forward market a party looking to acquire power could enter into a forward contract with another party for the delivery of a certain quantity of power per day for a month, anticipating the need for power on that day and also hedging its supply of power for the time period covered by the contract. As the delivery period begins, in traditional terms either of two things would happen. Either, the Seller would have negotiated that the Buyer prepay the full value of the contract for the month's delivery, or the Seller would deliver the power each day and then bill the Buyer for the month's delivery according to the contract. Both of these approaches have their difficulties. The first is unappealing to the Buyer because prepayment requires additional capital to finance the purchase. The second is unappealing to the Seller because it would deliver a month's contract of power to the Buyer without any compensation, and any risk as to the financial stability of the Buyer would be open through the month of delivery and the ten or twenty day payment cycle. Thus the Seller has to finance the fifty day period between its first delivery of the power and its expected receipt of payment. An alternate approach where invoices would be sent out each day for the power supplied would be a bookkeeping and accounting nightmare with increased costs on both sides of the transaction in generating and transmitting bills and processing payments receipts on the Seller side and receiving, processing and paying bills on the Buyer side. Thus, an alternative approach is desired which reduces the Seller's risk of loss for nonpayment from the current forty or fifty day cycle without the need for prepayment, which merely shifts the risk and expense of financing the transaction to the Buyer's side.

The invention relates to a method of shortening the payment cycle to match the delivery cycle of delivered commodities as closely as possible, and to a method of handling payment for such deliveries through a central, standardized payment agent which tracks scheduled deliveries and payments through electronic interfaces with the Buyers and Sellers of commodities, thereby reducing capital and overhead costs. The system is applicable both in connection with contracts which are for delivery of some product over a period of time and for futures contracts for future physical delivery of some product.

SUMMARY OF THE INVENTION

The invention is directed to a method of transmitting and receiving information related to a scheduled delivery of a commodity, and using this information, establishing a contractual payment agency relationship and collecting and paying the cost of such commodity on a set schedule. The invention is further directed to a method of collecting and paying the costs of such commodity through a single account, and via a single invoice to a payor/payee.

Still other objects and advantages of the invention will, in part, be obvious and will, in part, be apparent from the specification.

The invention accordingly comprises the features of construction, combinations of elements and arrangements of parts and steps and procedures which will be exemplified in the constructions and systems as hereinafter set forth, and the scope of the invention will be indicated in the Claims.

BRIEF DESCRIPTION OF THE DRAWINGS

For a fuller understanding of the invention, reference is had to the following description taken in connection with the accompanying drawings, in which:

FIG. 1 is a chart of netting by a hypothetical participant;

FIG. 2 is a table showing information required by the VMAC; and

DETAILED DESCRIPTION OF THE PREFERRED EMBODIMENTS

Figure 3:
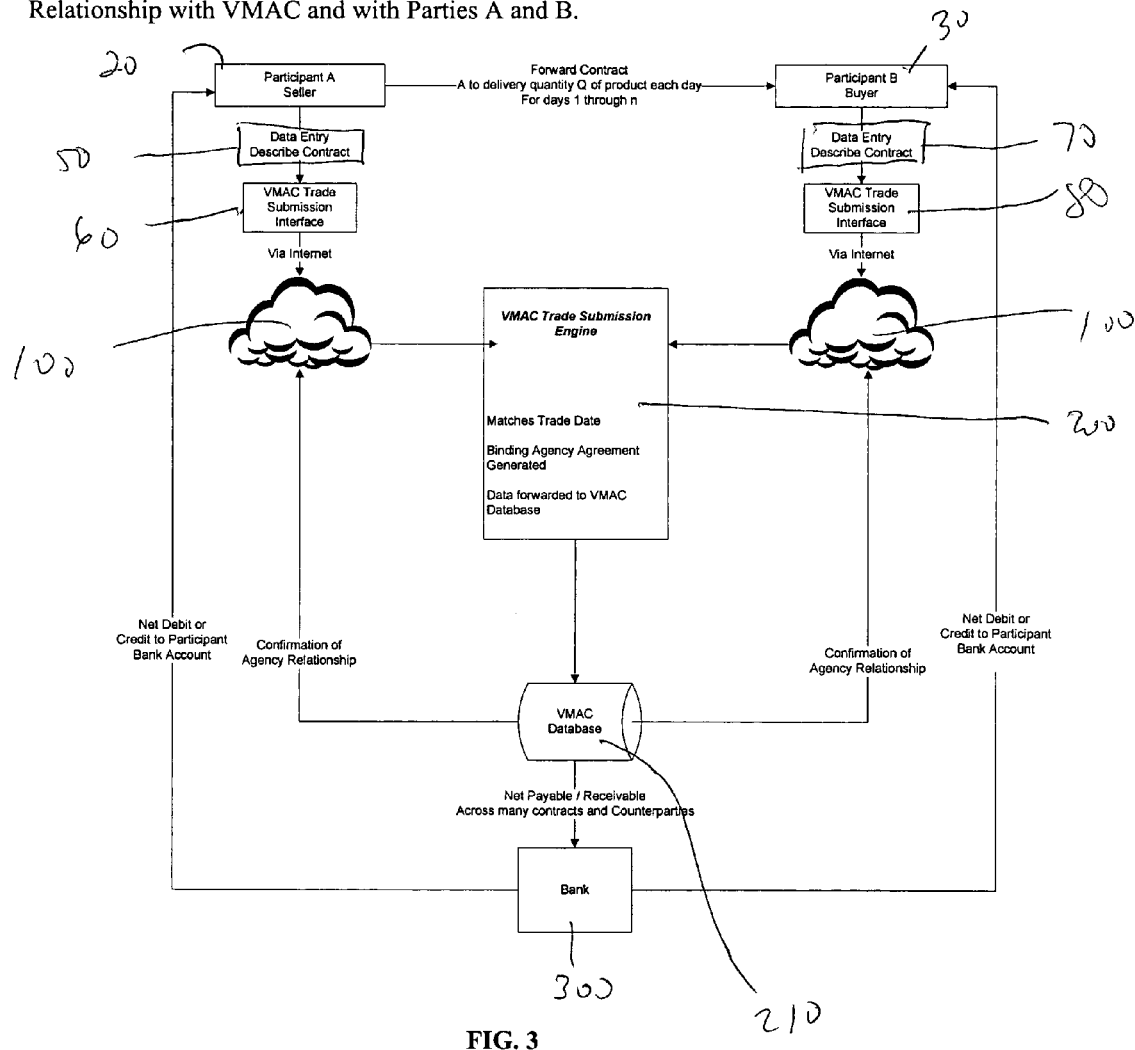
FIG. 3 is a flow chart diagram of the flow of data in accordance with the invention.

Under the Agency Program System, a virtual market control entity (hereafter referred to as the "VMAC"), operates a system in which a special purpose vehicle (hereafter referred to as the "VMACSPV") acts as central counterparty to swap contracts under a Paired Swaps program. The primary purpose of the swap program is to provide hedges for the purchase and sale of commodities at indexed or spot market prices. As swap counterparty, VMACSPV collects and pays daily cash settlements on every swap each business day. The daily cash settlements are with all participants in swap contracts. Swap contracts which have been entered into the VMAC system are known as VMAC Swaps.

Certain VMAC Swaps are used to hedge underlying contracts for the delivery and purchase of commodities. The Buyer or Seller of the commodity pays or receives the spot price each day for a quantity delivered on such day. The swaps pay the difference between the swap contract price and the index or spot price on the day of delivery, thus hedging the commodity price to the contract price. These swaps have declining notional amounts which match the delivery schedule of the underlying physical delivery contract hedged by the swap. The hedged forward contracts will involve physical delivery of a quantity of a commodity and payment for such commodity as determined by an index, thereby creating the account payable/receivable situation discussed above. The invention is related to the system for payments rather than the swaps themselves.

Forward Delivery Payment Netting Program

Under the VMAC Paired Swap Program, participants obtain VMAC Swaps to hedge contracts for physically delivered commodity, and by doing so, automatically appoint VMACSPV agent to handle payments for such commodity delivered under the hedged contract. Parties agree to pay and receive indexed prices per unit quantity for quantities delivered on scheduled delivery dates, all as specified in the hedged commodity contracts. Therefore the swaps and underlying contracts are perfectly matched hedges, with the parties paying/receiving the index for each quantity unit of delivered commodity, and receiving/paying, the difference between the index at delivery and the prior index or swap contract price.

VMAC operates a system which collects, transmits and records trade data related to the hedged contract, automatically generating a pair of mirrored swaps and two agency agreements, one for the potential Buyer and one for the potential Seller. As the hedged contract enters the scheduled delivery period, the VMAC calculates amounts payable and receivable each day, based on the delivery schedule of the underlying hedged contract. The VMAC then acts as agent for the Buyers and Sellers, collecting money from Buyers on the scheduled delivery date (or if such date is not a business day the business day immediately following such scheduled delivery date); VMAC then pays money to Sellers on the business day following the date of collection from a Buyer. The payments and collections are preferably done by the VMAC having access to and control of accounts in the names of the Seller and Buyer. In this way the Buyer and Seller need take no action to invoice or make a payment.

This lag between debiting the Buyer's account and crediting the Seller's account allows the VMAC to net amounts payable against receivables throughout its entire system, as described below. By netting the amounts payable and receivables throughout the entire system, a single payment into or debit out of the party's account can be made for all transactions which have been assigned to the VMAC. When a transaction is assigned to the VMAC it will be referred to as a VMAC'ed Transaction.

VMAC Cash Market Payment Netting Program

The VMAC has a further financial product which substantially reduces the accounts receivable cycles for cash market commodities traders. The VMAC Cash Market Netting Program ("CMNP") covers day-ahead and balance of week transactions for commodities and near-commodities, including gas and electricity transactions ("Cash Market Transactions").

The CMNP product allows Participants to transmit relevant transaction data in respect of Cash Market Transactions to VMAC on the day transacted through an electronic interface. As with the Forward Delivery Payment Netting Product each party must be a VMAC participant to the VMAC using the system software or other communication. When the VMAC has matched the transaction data it completes receipt and establishment of the transaction as a VMAC'ed transaction.

For these transactions, swap hedges are not required. Data from a specific Buyer and Seller pair are matched and recorded in a VMAC Database. No swaps are generated, but the VMAC is automatically appointed agent for both Buyer and Seller. The VMAC collects from the applicable Buyer the price to be paid under the Cash Market Transaction on the quantity of the commodity to be delivered under the Cash Market Transaction on the date of scheduled delivery. On the next succeeding Business Day, the price is paid to the Seller by the VMAC. Together these are referred to as "Daily Cash Market Payments." No collateral is required in connection with the agency arrangement. What is actually transferred to the Seller's account is, however, a netted amount in respect of all its VMAC'ed Transactions.

Daily Cash Market Payments in respect of multi-day Cash Market Transactions are controlled by the same rules which apply to Daily Delivery Payments on forward contracts in relation to substantial delivery failures. With forward contracts if there is a failure to timely pay for delivery in the current market the Seller will only become aware of it after the delivery period has been completed, invoicing has been sent and the Buyer fails to make timely payment. This is often forty to fifty days after the start of delivery, and a full contract for a month's delivery, as well as partial delivery on another month's delivery may define the Seller's exposure to Buyer's credit risk. This is obviously a very significant risk that the Seller retains. However, with the Daily Delivery Payments system implemented by the VMAC a payment default would become known with only one day's payment in default, allowing the Seller to manage the risk and terminate performance if the default is not immediately cured.

There are two principal benefits derived from the Forward Delivery Transactions and Cash Market Transactions product: Reduction of accounts receivable and netting.

First, current standard market practices allow substantial accounts receivable and accounts payable to accrue; generally up to an average of 30 to 50 days. Using the CMNP, forward credit risk is limited to one day. Overall risk built up in Cash Market Transactions is reduced dramatically on a system-wide basis.

The second principal benefit is that Daily Cash Market Payments are included in the VMAC netting pool, which includes daily mark-to-market amounts on VMAC Swap Transactions and Daily Delivery Payments on forward contracts hedged with Swap Transactions (the Daily Delivery Payments on the underlying forward transactions are paid to the VMAC on an agency basis in the same manner as the Cash Market Transactions where the VMAC forwards the payments to the appropriate counterparty the next business day). Daily Cash Settlement Payments and Daily Delivery Payments to be paid and received are netted so that a single net cash payment or debit is made each day.

Daily Cash Market Payments to be paid and received will be added to this pool. As a result the following netting will occur on each Business Day:

Daily Cash Market Payments to be received will net out against such Payments to be paid, across all counterparties and products.

Daily Cash Settlement Payments on Swap Transactions to be received will net out against such Payments to be paid, across all counterparties and products.

Daily Delivery Payments on forward contracts hedged with Swap Transactions to be received will net out against such Payments to be paid, across all counterparties and products.

The net amounts of each of these three netted Payment categories will be netted against each other to determine a net amount to be paid or received by a Participant each Business Day.

Reference is made to FIG. 1 in which the table there illustrates a netting scenario for a hypothetical Participant. In that example the hypothetical participant is in both the power and gas markets and has used the VMAC to act in connection with transactions for Daily Cash Settlements(Swaps), Daily Cash Delivery (Forwards) and Daily Cash Market. Of course the hypothetical participant can be involved with a multitude of other counterparties. Each of the counterparties must VMAC the transactions so that the VMAC acts as the paying and billing agent for all of the transactions. The effect of it is that each day the VMAC will debit or credit each participants account once, netted for all the various transactions. The VMAC will calculate this each day for each of the participants who have at least one VMAC'ed Transaction.

The Cash Market Transaction product is an elaboration of the Daily Delivery Payment structure currently documented and the systems in place for transaction data submission and calculations. Thus, limited legal and systems adaptation is required for Participants. As with the Daily Delivery Payment structure, all VMAC'ed Transactions are performed under standardized contracts established by the VMAC. Only the financial terms of the transactions are negotiated between the counterparties. This assures that no disputes arise over any of the terms of different contracts and/or that in back-to-back or hedging contracts no different sets of terms prevail. Uniformity of contract terms increases the commoditization of the products.

It should be noted that the Cash Market Transaction product could be used by an Independent System Operator (ISO) or a Regional Transmission Operator (RTO). These entities currently exist to distribute power throughout the United States. Examples include the New York ISO, MISO and PJM. Data on accounts receivable and payable would be transmitted to the VMAC and the cash payable to and from the ISO in respect of Participants would constitute Daily Cash Market Payments to be collected from and paid to the ISO. The ISO would implement true up processes to account for deliveries which don't exactly correspond to the notional amounts. This would allow the ISO to dramatically reduce its exposure to credits of its members (limiting it to the refunds payable by capacity providers). It would also allow the Participants to take advantage of the netting described above. In a preferred embodiment the ISO would become a participant in a VMAC which would perform the same roles described above, though one of the parties in each transaction would be the ISO. Alternatively, the ISO can itself set up a VMAC to operate the control of the Daily Cash Market Payments.

Using VMAC interface software, each party to a forward contract will enter data including, but not necessarily limited to, the data shown in FIG. 2. in table form. Generally the name of the participant and the counterparty, the product, delivery period and the quantity are required. Usually, the price will also be included or the index to which the price is linked.

Reference is next made to FIG. 3 wherein a graphical flow chart diagram of the VMAC System of trade data entry which establishes an agency relationship with the VMAC and with parties A and B is depicted. Generally, the Figures shows participant A 20, the Seller in a forward contract where A is to deliver a quantity Q of product each day for days 1 through N to participant B 30, the Buyer. If Seller 20 and Buyer 30 desire to VMAC the transaction, then each accesses the VMAC software, which is designed to interact with the VMAC system to describe the terms of the contract reached. For Seller 20 in box 50, a data entry describing the forward contract is made into the software. The software is designed to provide an interface for easily entering the required information of the type shown in FIG. 2, as well as the financial terms of the specific type of transaction involved.

Then, the software utilizes its VMAC trade submission interface 60, which connects in a secure faction through the internet 100 with the VMAC trade submission engine 200. Similarly, Buyer 30 enters its information regarding the forward contract into its data entry software 70, which, in turn, utilizing the VMAC trade submission interface 80 accesses the VMAC trade submission engine through internet 100. In practice, the software present at Seller 20 and Buyer 30 would generally be the same software. In addition to allowing entry of data regarding transactions, the software also acknowledges receipt of confirmations from the VMAC trade submission engine via VMAC database 210 and internet 100.

Generally, the VMAC trade submission engine initially acknowledges the receipt of the data entry from Seller 20 and also from Buyer 30 in a separate confirmation. When the VMAC trade submission engine 200 is able to match the trade data between Seller 20 and Buyer 30 it generates a binding agency agreement with each of Seller 20 and Buyer 30. That data is then forwarded to the VMAC database 210, which then sends a confirmation of the matching of the trade data, acceptance of the transaction as a VMAC'ed transaction, and the confirmation of the agency relationship in connection with that VMAC transaction to both Seller 20 and Buyer 30. The software at Seller 20 and Buyer 30 sites also provides reports for each of the VMAC'ed transactions which are in the system, as well as tracking the cash flows between VMAC and each participant for all their VMAC'ed transactions.

While the transaction identified in FIG. 3 is a forward contract, each of the transactions of the sort described above can also be entered into the VMAC software. As part of a participant's entry into an agency relationship with the VMAC, it must enable a bank account which will serve as a source of the funds required to be paid from the participant to the VMAC for further payment on to appropriate counterparties and to receive any payments related to its transactions from the VMAC. Generally, the VMAC operates accounts established with a bank at which it operates for each of the participants and the VMAC is given authorization to debit and credit these accounts as it finds appropriate based upon the transactional activity.

It is instructive to describe the flow of activity with respect to a forward contract system which then enters into a delivery time frame and the movement of funds to accommodate that result. If counterparties A and B enter into a forward contract for the delivery of power for 30 days commencing Apr. 1, 2006 on Jan. 25, 2006 at a price of $50 on the first day when the transaction is VMAC'ed by both parties, the contract would be in place with matching swaps between participant A and the VMAC and participant B and the VMAC. Each of those swaps would be indexed to market so that, in the event of a default by the other participant, there will be an ability to mitigate losses by covering the transaction. The difference between the contract rate and the current market rate is settled each day as the market rate closes and an appropriate security payment is made to equalize the risk so that, between the security amount obtained in connection with the hedge through the VMAC and the market price, the non-defaulting party could make itself whole, at least as of the prior day's settlement.

These adjustments continue through the time for delivery to commence and through completion of the delivery period. Thus, in the example described above, on Apr. 1, 2006, the Seller would deliver the required power to the Buyer and the VMAC settlement system would debit the Buyer's account with bank 300 in the amount of the notional cost for that date under the contract. The notional cost is the price multiplied by the required amount of product to be delivered. The remaining amount of the delivery contract still unperformed would continue to be indexed with the security positions through the VMAC swaps continuing to be marked to the index. As described above, the Buyer in the transaction during the delivery, would, each day be debited for its purchases under the contract to be delivered that day netted with adjustment to the VMAC Swap, if any. The Seller would receive its payments the next day, netted with its other obligations and receipts. In this way, the VMAC always maintains an even book and only pays out that which it has received the previous day. Generally, any adjustments between the notional delivery amounts and the amounts actually delivered are handled directly between the Buyer and the Seller, either at the end of the contract term or at some customary market interval. Both the continued hedging, which marks the contract to the market index, and the daily payment regime are implemented by the VMAC through its possession of the transactional data received when the transactions were VMAC'ed and through its operation of the hedging activities through the joint swaps which are marked to market each day.

In addition, the system is adapted to exclude a transaction from the agency payment system for one or more days when commercial indications require this activity. The system can selectively exclude from the agency payment calculations a single participant and transaction or transactions for a period of time as appropriate. Various commercial reasons can develop which require this activity. Primarily, this would result from a buyer's notifying the payment agency based upon seller's failure to deliver and, thus, the need to remove this transaction from the agency payment calculations.

Essentially, there are two separate regimes which can be implemented using the VMAC paying agency system. The first is the forward system with deliveries and the other is the spot market system using the cash market payment netting program. The cash market payment netting program deals with purchases made for short term deliveries and not for deliveries over an extended period of time as would be appropriate in the forward contract with extended delivery periods. Because the spot market is also subject to participants' buying and selling the same capacity at different times, the netting aspects of the VMAC paying agency system allows for the reduction in unnecessary transfers between participants. The system is particularly useful for entities such as the ISO's which often act in a fashion where all transactions are with the ISO, whether purchases from the ISO or sales to the ISO. In this way, parties dealing with the ISO can be billed on a daily basis netted with all payments due from and to the participants.

While the two netting systems have been shown with reference to power and gas contracts they are applicable to other types of transactions which share some of their characteristics. Other types of products which can be VMAC'ed transactions include, but are not limited to gas, coal, extraction of natural resources, petroleum distillates, chemical plant products, internet bandwidth and other products which, by use of standardized contracts, can be made relatively fungible and commoditized. Another element is the feature that the products tend to either be immediately consumed, converted into some other form or commingled with other products so they cannot easily be separated out.

The VMAC operates through a computer system with servers which communicate with each of the market participants either through the internet or through a dedicated connection. The VMAC servers also communicate with the bank or other financial institution to control the flow of money from and to the participants and through the VMAC's account for the overnight holding as funds are distributed each day with netting taking place after all funds have been received, to be disbursed (netted with the next day's deletions) the next morning to the participants.

Accordingly, an Agency Payment System which includes a formal delivery payment netting program and a cash market payment netting program using the VMAC system is provided.

It will thus be seen that the objects set forth above, among those made apparent in the preceding description, are efficiently obtained and, since certain changes may be made in the above constructions without departing from the spirit and scope of the invention, it is intended that all matter contained in the above description or shown in the accompanying drawings shall be interpreted as illustrative, and not in a limiting sense.

It is also to be understood that the following claims are intended to cover all of the generic and specific features of the invention, herein described and all statements of the scope of the invention which, as a matter of language, might be said to fall therebetween.

What is claimed is:

1. A method for operating an agency payment system for transactions covered by a virtual market control entity between participants in said agency payment system with said virtual market control entity, said transactions being for daily delivery of a commodity product over a set delivery period, said agency payment system having a data entry device, a database, a calculating means, a computing means, and a processor, said method comprising the steps of:

entering into said database with said data entry device required amounts of product to be delivered and a delivery period in connection with each transaction, a cost for the product and calculating the daily product cost for a notional amount of product to be delivered between participants on a single day during the delivery period for each transaction;

determining with said calculating means, during the delivery period for each transaction, for each participant to each transaction, daily payment of the daily product cost required to be made to the virtual market control entity or to be received from the virtual market control entity;

determining with said computing means all payments of daily product costs required to be made and received on a given day by the virtual market control entity, acting solely as an agent for each participant, so as to determine the amount of a potential default by each participant for each transaction at the end of each day;

netting, with said processor, the amounts payable and receivable at the end of each day separately for each participant including all of each participant's required payments of daily product costs made to the virtual market control entity, and all daily delivery costs by other participants to said virtual market control entity, which correspond to said virtual market control entity owing the daily delivery cost to the participant, which are due to the participant, to obtain a net cash single payment movement, either from the virtual market control entity to each participant's bank account or from each participant's bank account to the virtual market control entity; and transferring said net cash single payment movement for each participant either from the virtual market control entity to each participant's bank account or from each participant's bank account to the virtual market control entity as calculated by the netting step.

2. The method for operating an agency payment system of claim 1 further including the step of acknowledging receipt of notification of new transactions to be covered by the virtual market control entity from the participants to each new transaction.

3. The method for operating an agency payment system of claim 2 further including, the step of determining whether the notification received from the participants to a new transaction meets requirements for coverage by the virtual market control entity and notifying each of the participants whether the transaction is covered by the virtual market control entity.

4. The method for operating an agency payment system of claim 3 wherein the step of determining whether to cover a transaction includes checking to confirm that the terms of the transaction are identical from each of the participants to the transaction, determining that the transaction is either a forward contract transaction for a covered product or a spot market transaction for a covered product and checking that each of the participants is a participant registered with the virtual market control entity and not in default under a previous covered transaction.

5. The method for operating an agency payment system of claim 1 wherein the step of netting of the required payments of daily product costs to be made with the payments of daily product costs received by the virtual market control entity on the previous day includes netting of required payables and receipts of daily cash settlement for swaps, daily delivery for forward contracts and daily cash market for spot market contracts.

6. The method for operating an agency payment system of claim 1 further comprising the step of calculating indexed payments in respect of an underlying bilateral transaction that relates to matched swap hedges for each participant to match swap hedges in terms of price, timing and quantity.

7. The method of operating an agency payment system of claim 6 further comprising the steps of establishing paired swaps with pairs of participants in forward transactions and calculating the indexed payments against a daily index, marking the swap hedges established between the virtual market control entity and each participant to the index on a daily basis and generating differential payment amounts of equal and opposite amounts to the participants based on the movement of the daily index.

8. The method for operating an agency payment system of claim 6 wherein the virtual market control entity further comprising the step of selectively ceasing agency payment calculations in respect of a single participant and transaction for a period of time.

9. The method of operating an agency payment system of claim 1 further comprising the step of netting daily cash market payments to be received against payments to be paid, across all counterparties and products.

10. The method of operating an agency payment system of claim 9 further comprising the step of netting daily cash settlement payments on swap transactions to be received against payments to be paid, across all counterparties and products.

11. The method of operating an agency payment system of claim 10 further comprising the step of netting daily delivery payments on forward contracts hedged with swap transactions to be received against payments to be paid, across all counterparties and products.

12. The method of operating an agency payment system of claim 11 further comprising the step of netting the net amounts of the netted payment categories against each other to determine a net amount to be paid or received by each participant each business day.

13. The method of operating an agency payment system of claim 12 further comprising the step of allowing any payment adjustments between the notional delivery amounts and the amounts actually delivered to be handled between each participant to each transaction.

14. The method of operating an agency payment system of claim 1 further comprising the step, for each participant, of enabling a bank account for making and receiving daily payments.

15. An agency payment system for transactions covered by a virtual market control entity between participants in said agency payment system with said virtual market control entity, said transactions being for daily delivery of a commodity product over a set delivery period, said agency payment system comprising:
   a data entry device for receiving information relating to contract terms and bank information for each transaction and for each participant in each transaction;
   a virtual submission interface operating over the Internet to match contract terms of each participant in each transaction to form a binding agency agreement with each participant in each transaction and said virtual market control entity, when a match is determined;
   a first calculating means for determining, during the delivery period for each transaction, daily payment of the daily product cost, for each participant to each transaction, required to be made to the virtual market control entity or received from the virtual market control entity, so as to determine a potential default by each participant for each transaction at the end of each day if the daily payment is not made for each transaction;
   a second calculating means for determining all daily payments of daily product costs under all transactions with each participant required to be made and received on a given day by the virtual market control entity, acting solely as an agent for each participant, so as to determine the amount of a potential default by each participant for each transaction at the end of each day;
   a netting means for netting the amounts payable and receivable at the end of each day separately for each participant including all of each participant's required payments of daily product costs made to the virtual market control entity, and all daily delivery costs by other participants to said virtual market control entity, which correspond to said virtual market control entity owing the daily delivery cost to the participant, which is due to the participant, to obtain a net cash single payment movement, either from the virtual market control entity to the participant's bank account or from the participant's bank account to the virtual market control entity; and
   a database controller for receiving data on the matched contracts, sending a confirmation to the participants of the contracts, confirming of the agency payment relationship, and transferring the funds between the virtual market control entity and each participant at the end of each day.

16. The agency payment system of claim 15 wherein said first calculating means nets daily cash market payments to be received against payments to be paid, across all counterparties and products.

17. The agency payment system of claim 16 wherein said first calculating means nets daily cash settlement payments on swap transactions to be received against payments to be paid, across all counterparties and products.

18. The agency payment system of claim 17 wherein said first calculating means nets daily delivery payments on forward contracts hedged with swap transactions to be received against payments to be paid, across all counterparties and products.

19. The agency payment system of claim 18 wherein said first calculating means nets the net amounts of the netted payment categories against each other to determine a net amount to be paid or received by each participant each business day.

20. The agency payment system of claim 15 wherein said virtual submission interface determines whether participants to a new transaction meet requirements for coverage by the virtual market control entity and notifying each of the participants whether the transaction is covered by the virtual market control entity.

21. The agency payment system of claim 15 wherein said virtual submission interface determines whether to cover a transaction by checking to confirm that the terms of the transaction are identical from each of the participants to the transaction, determining that the transaction is either a forward contract transaction for a covered product or a spot market transaction for a covered product, and checking that each participant is registered with the virtual market control entity and not in default under a previous covered transaction.

22. The agency payment system of claim 15 wherein said netting means nets required payments to be made with the payments received by the virtual market control entity on the previous day by netting required payables and receipts of daily cash settlement for swaps, daily delivery for forward contracts and daily cash market for spot market contracts.

23. The agency payment system of claim 15 wherein said second calculating means calculates indexed payments in respect of an underlying bilateral transaction for each participant that relates to matched swap hedges to match swap hedges in terms of price, timing and quantity.

24. The agency payment system of claim 23 wherein said database controller can selectively cease agency payment calculations in respect of a single participant and transaction for a period of time.

* * * * *